Dec. 9, 1952

M. E. McMAHON 2,620,672

POSITION SELECTOR

Filed Oct. 22, 1948

INVENTOR.
MORGAN E. McMAHON
BY Bruce & Brosler
HIS ATTORNEYS

Patented Dec. 9, 1952 2,620,672

UNITED STATES PATENT OFFICE 2,620,672

POSITION SELECTOR

Morgan E. McMahon, Oakland, Calif.

Application October 22, 1948, Serial No. 55,940

6 Claims. (Cl. 74—10.41)

My invention relates to switching apparatus for use in electronic or power equipment, and more particularly to a position selector for use in conjunction with such apparatus.

The purpose of the present invention is to provide novel and improved means for enabling one to accurately reset a control knob or dial to a predetermined position, whether such knob or dial be employed in tuning electronic apparatus to a predetermined wave length or merely in adjusting a piece of equipment to any one of many possible switch positions.

The device of the present invention is designed to accomplish this end with hairline accuracy, which is very important, particularly in connection with the tuning of highly sensitive electronic equipment, and is capable of providing such adjustments with ease, and throughout an angle of 360 degrees if desired.

Additional features of the invention will be brought out in the following description of my invention, taken in conjunction with the accompanying drawings wherein—

Figure 1:
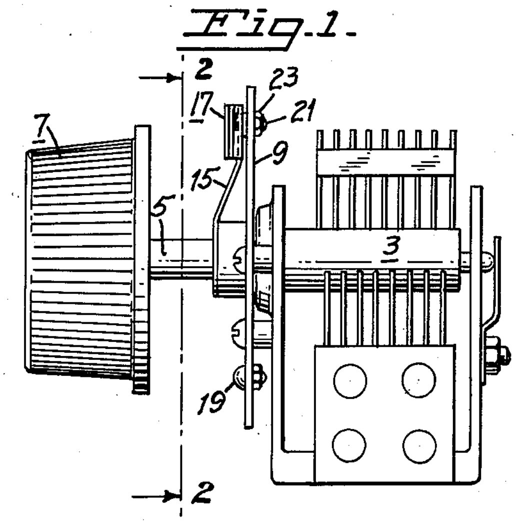
Figure 1 is a side elevational view of a tuning condenser assembly utilizing the present invention.
Figure 2:
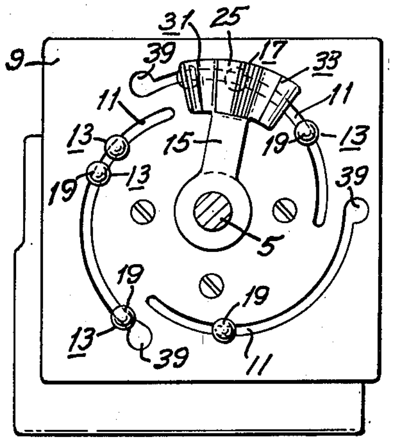
Figure 2 is a view taken in the plane 2—2 of Figure 1.

Referring to the drawings for the details of the present invention, the embodiment of Figure 1 depicts the invention as embodied in a tuning condenser assembly which, in addition to the tuning condenser 3, involves a control shaft 5 extending therefrom and carrying a control knob 7, and a panel 9 fixedly mounted on said tuning condenser and through which the shaft passes.

The panel and control knob constitute a pair of elements, one movable relative to the other. Formed in one of said elements, namely the panel in the embodiment under consideration, are a plurality of arcuate slots 11 having their centers of curvature at equally spaced points about the axis of the shaft, thereby permitting said slots to overlap one another.

These slots are intended to slidably receive position stop pins 13 which are adapted to be fixed or immobilized at selected positions determinative of desired adjustments of apparatus controllable through the shaft, such as the tuning condenser illustrated.

Affixed to the shaft for rotation with the knob is a radially disposed stop spring 15 whose free end is adapted to ride over the stop pins and effect a separable engagement therewith in succession. It will be clear that by making the engageable portion 17 of this spring of such design as to span the overlapping portions of the arcuate slots, the stop spring is adapted to shift its cooperating action from the stop pins in one slot to the stop pins of the succeeding slot, thus providing for 360 degrees of operation without the structural complications which would necessarily arise, were one to attempt to provide a continuous 360 degree slot in the panel.

Each of the stop pins is of simple construction, comprising a hemispherical head 19 at the terminal of a threaded shank 21 which is adapted to receive a tightening nut 23. Conventional machine screws, though provided with the conventional screw driver slot, can adequately serve the purpose. In either event, the shanks should preferably present flat sides to the edges of the slots to preclude rotation of the pins during tightening of the nuts thereon.

The pin engaging end of the stop spring is formed into an angular resilient trough 25 by bending or creasing the same along the longitudinal axis to an extent sufficient to span the overlapping portions of the arcuate slots, such angular trough being of a size to straddle the hemispherical head of the stop pin, in which position it resiliently engages the same at two oppositely disposed points 27 and 29 located on the angularly disposed walls forming the trough.

Extending upwardly from each side edge of the trough and terminating in a plane approaching the plane of tangents to the peaks of the hemispherical heads of the stop pins, is a wing 31 and 33 respectively, which provides for smooth and shockless contact between the stop spring and a stop pin as they approach each other, while the portion 35 adjacent the trough is preferably planar to provide linear lift and thereby facilitate the relative movement of a stop pin into stop position under the spring.

Figure 3:
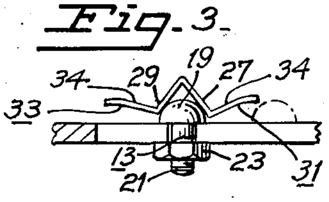
Figure 3 is a view depicting a detail of construction of the cooperating stop elements.
Figure 5:
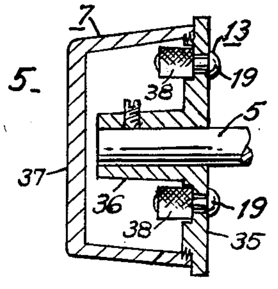
Figure 5 is a view in section of a detail of the construction of Figure 4.
Figure 6:
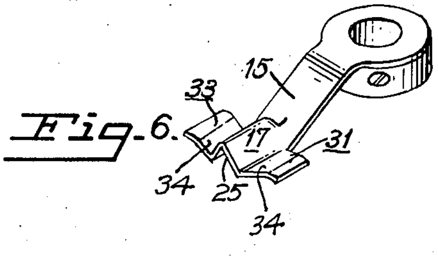
Figure 6 is a three-dimensional view of one of the cooperating stop elements of Figure 3.

It will be clear from an examination of the detail of Figure 3, that the two-point contact between the spring and the head of a stop pin can permit only of accurate alignment between the two stop elements, thus enabling hairline control or re-setting of apparatus through the use of such stop elements.

A further advantage of such construction is the economy of manufacture involved, for the matter of tolerances or accuracy of fit is not a problem.

Figure 4:
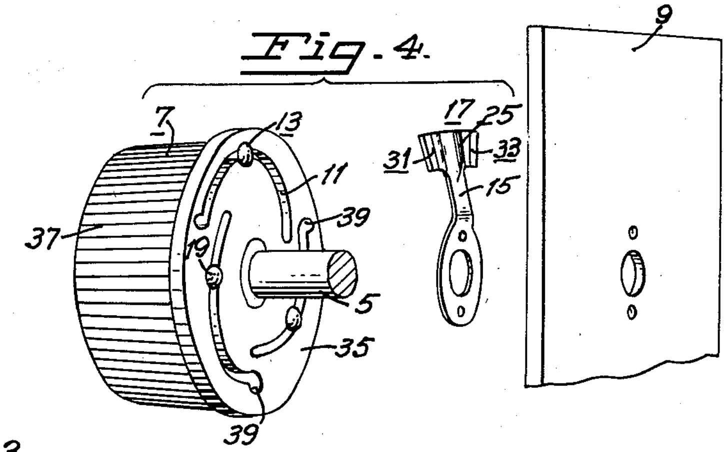
Figure 4 is an exploded view of a modified form of the invention depicted in Figure 1.

The embodiment of Figure 4 depicts an installation which may be considered the reverse of that of Figure 1 in that the stop spring is fixed to the panel and faces the control knob while the arcuate slots are now provided in the rotatable element or knob for holding the stop pins.

In providing for such construction, the knob is preferably formed of two components, namely a disk 35 with shaft bushing 36, and a cap 37 threadedly connected to the disk. The disk is provided with the arcuate slots for receiving the stop pins, and in this embodiment, the nuts may be of the knurled type 38, permitting them to be tightened manually before applying the cap.

Since, in the embodiment of Figure 4, the stop pins will be rotated with the control knob, the stop spring is, therefore, fixed as to its position against such rotation by affixing it to the panel.

In some types of installations, access to the rear of the pin mounting panel is difficult, and with this in mind, it is contemplated to provide a way for mounting such pins from the front of the panel and without the necessity of conducting any operations behind the panel. This I am able to accomplish very simply and conveniently by providing a cut-out 39 at the corresponding end of each of the arcuate slots, sufficiently large to permit of the passage of the head of a pin. With the nut partly threaded on the shank of such pin, the pin may readily be immobilized at any desired position.

In order not to unnecessarily weaken that portion of the panel between the overlapping ends of the arcuate slots, I prefer to offset the cutouts in a direction away from the overlapping portion of the adjacent slot.

From the above description of my invention, it will be apparent that the same fulfills its intended purpose and provides the advantages claimed therefor, and while I have disclosed my invention in two forms, the same is subject to further alteration and modification without departing from the underlying principles involved, and I accordingly do not desire to be limited in my protection to the specific details illustrated and described, except as may be necessitated by the appended claims.

I claim:

1. A position selector comprising a pair of elements, one movable relative to the other; a shaft fixed at one end to one of said elements and passing through the other; one of said elements having a plurality of overlapping arcuate slots therethrough having their centers of curvature at equally spaced points about the axis of said shaft; a plurality of stop pins slidably assembled in said slots, each of said pins having means for immobilizing such pin at a point in said slots determinative of a desired adjustment of apparatus controllable through said shaft; and a stop spring associated with said other element and having one end movable over and in contact with said pins.

2. A position selector comprising a pair of elements, one movable relative to the other; a shaft fixed at one end to one of said elements and passing through the other; one of said elements having a plurality of overlapping arcuate slots therethrough having their centers of curvature at equally spaced points about the axis of said shaft, and a cut-out at the corresponding end of each of said slots; a plurality of stop pins slidably assembled in said slots, each of said pins having a threaded shank terminating at one end in a hemispherical head and at its other end carrying a nut for immobilizing such pin at a point in a slot determinative of a desired adjustment of apparatus controllable through said shaft, such head being receivable through any of said cut-outs; and a stop spring associated with said other element and having one end movable over and in contact with said pins.

3. A position selector comprising a pair of elements, one movable relative to the other; a shaft fixed at one end to one of said elements and passing through the other; one of said elements having a plurality of arcuate slots therethrough, and a cut-out at the corresponding end of each of said slots; a plurality of stop pins slidably assembled in said slots, each of said pins having a threaded shank terminating at one end in a hemispherical head and at its other end carrying a nut for immobilizing such pin at a point in a slot determinative of a desired adjustment of apparatus controllable through said shaft, such head being receivable through any of said cut-outs; and a stop spring associated with said other element and having one end movable over said pins, said end being bent along the longitudinal axis of said spring to form an angular trough adapted to straddle the hemispherical head of each such pin and contact the same at two oppositely disposed points on the angularly disposed walls forming said trough.

4. A position selector comprising a pair of elements, one movable relative to the other; a shaft fixed at one end to one of said elements and passing through the other; one of said elements having a plurality of overlapping arcuate slots therethrough having their centers of curvature at equally spaced points about the axis of said shaft; a plurality of stop pins slidably assembled in said slots, each of said pins having a threaded shank terminating at one end in a hemispherical head and at its other end carrying a nut for immobilizing such pin at a point in said slots determinative of a desired adjustment of apparatus controllable through said shaft; and a stop spring associated with said other element and having one end movable over said pins, said end being bent along the longitudinal axis of said spring to form an angular trough adapted to straddle the hemispherical head of each such pin and contact the same at two oppositely disposed points on the angularly disposed walls forming said trough, and a wing extending from each free edge of said trough and terminating in a plane approaching the plane of tangents to said hemispherical head at the peak thereof.

5. A position selector comprising a pair of elements, one movable relative to the other; a shaft fixed at one end to one of said elements and passing through the other; one of said elements having a plurality of overlapping arcuate slots therethrough having their centers of curvature at equally spaced points about the axis of said shaft, and a cut-out at the corresponding end of each of said slots; a plurality of stop pins slidably assembled in said slots, each of said pins having a threaded shank terminating at one end in a hemispherical head and at its other end carrying a nut for immobilizing such pin at a point in a slot determinative of a desired adjustment of apparatus controllable through said shaft, such head being receivable through any of said cut-outs; and a stop spring associated with said other element and having one end movable over said pins, said end being bent along the longitudinal axis of said spring to form an angular trough adapted to straddle the hemispherical head of each such pin and contact the same at two oppositely disposed points on the angularly disposed walls forming said trough, and a wing extending from each side edge of said trough and terminating in a plane approaching the plane of tangents to said hemispherical head at the peak thereof.

6. A position selector comprising a stop pin having a substantially hemispherical head, a stop spring terminating in a stop pin engageable end, said end being bent along the longitudinal axis of said spring to form an angular trough adapted to straddle said hemispherical head and contact the same at two oppositely disposed points located on the angularly disposed walls forming said trough, and a wing extending from each side edge of said trough and terminating in a plane aproaching the plane of tangents to said hemispherical head at the peak thereof.

MORGAN E. McMAHON.

REFERENCES CITED

The following references are of record in the file of this patent:

UNITED STATES PATENTS

| Number | Name | Date |
|---|---|---|
| 2,115,245 | Allison | Apr. 26, 1938 |
| 2,143,665 | Sullinger | Jan. 10, 1939 |
| 2,454,069 | Lefler | Nov. 16, 1948 |

FOREIGN PATENTS

| Number | Country | Date |
|---|---|---|
| 14,036 | Great Britain | June 17, 1912 |
| 431,702 | Great Britain | July 15, 1935 |
| 40,818 | Denmark | Mar. 29, 1928 |